United States Patent
Yang et al.

(10) Patent No.: US 7,740,757 B2
(45) Date of Patent: *Jun. 22, 2010

(54) APPARATUS FOR REMOVING BUOYANT POLLUTANTS

(75) Inventors: Ming-Lu Yang, Tu-Cheng (TW); Wei-Guo Yang, Shenzhen (CN); Zheng-Hong Chi, Shenzhen (CN); Yu-Jun Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/126,983

(22) Filed: May 26, 2008

(65) Prior Publication Data
US 2009/0145834 A1 Jun. 11, 2009

(30) Foreign Application Priority Data
Dec. 7, 2007 (CN) .................... 2007 1 0202936

(51) Int. Cl.
*B01D 17/028* (2006.01)
*B01D 17/032* (2006.01)

(52) U.S. Cl. .................. 210/171; 210/521; 210/526; 210/540

(58) Field of Classification Search .............. 210/171, 210/521, 522, 523, 525, 526, 538, 540
See application file for complete search history.

(56) References Cited

U.S. PATENT DOCUMENTS

| | | | | | |
|---|---|---|---|---|---|
| 4,049,553 | A | * | 9/1977 | Stebbins et al. | 210/540 |
| 4,235,726 | A | * | 11/1980 | Shimko | 210/523 |
| 4,271,017 | A | * | 6/1981 | Milgram | 210/522 |
| 4,551,246 | A | * | 11/1985 | Coffing | 210/540 |
| 5,015,393 | A | * | 5/1991 | Russell et al. | 210/525 |
| 5,132,010 | A | * | 7/1992 | Ossenkop | 210/522 |
| 5,458,770 | A | * | 10/1995 | Fentz | 210/521 |
| 5,728,304 | A | * | 3/1998 | Yeh | 210/521 |
| 5,738,782 | A | * | 4/1998 | Schafer et al. | 210/171 |
| 5,942,128 | A | * | 8/1999 | Fortier | 210/171 |
| 6,260,716 | B1 | * | 7/2001 | Fontaine et al. | 210/525 |
| 2009/0145824 | A1 | * | 6/2009 | Yang et al. | 210/122 |
| 2009/0184049 | A1 | * | 7/2009 | Murray et al. | 210/521 |

* cited by examiner

*Primary Examiner*—Christopher Upton
(74) *Attorney, Agent, or Firm*—Zhigang Ma

(57) ABSTRACT

An exemplary apparatus (20), for removing pollutants atop a body of coolant, includes a filter (21), a pollutant removing structure (22), and a pump (23). The filter includes a housing (210), and a filtering unit (211) positioned in the housing for removing the pollutants from the coolant. The filtering unit is separated into a first cavity (2112) and a second cavity (2113) by a partition sheet (213). The partition sheet is spaced apart from a bottom surface of the housing to define a communicating gap (2131) for the first cavity and the second cavity to communicate with each other. The pollutant removing structure is positioned on the filter. The pollutant removing structure includes a removing member (221) for removing the pollutants out of the filter. The pump is configured for pumping the coolant into the first cavity of the filter.

13 Claims, 6 Drawing Sheets

APPARATUS FOR REMOVING BUOYANT POLLUTANTS

CROSS-REFERENCE TO RELATED APPLICATIONS

This application is related to two co-pending U.S. patent applications, application Ser. No. 12/107,777 filed on Apr. 23, 2008, entitled "APPARATUS FOR REMOVING BUOYANT POLLUTANTS", and a co-pending U.S. patent application Ser. No. 12/126,984, entitled "APPARATUS FOR REMOVING BUOYANT POLLUTANTS FROM POLLUTED COOLANT", wherein the inventor is Ming-Lu Yang et al. Both of such applications have the same assignee as the present application. The disclosures of the above identified applications are incorporated herein by reference.

BACKGROUND

1. Field of the Invention

The present invention generally relates to apparatuses for removing buoyant pollutants, and more particularly, to an apparatus for removing buoyant pollutants having oil and debris floating atop a body of coolant.

2. Discussion of the Related Art

In order to prevent overheating of cutting tools, a coolant is generally applied to the cutting tool to cool it. However, when using the cutting tool, pollutants, such as oil, and debris, such as dust and other particles, may contaminate the coolant in a coolant tank. The oil generally floats atop the coolant. Some of the debris will mix with the coolant, some debris will sink to the bottom of the coolant, and some debris will mix with the oil and float atop the coolant. Because the majority of coolants for cutting tools are viscous, most of the debris will mix with the oil and float atop the coolant.

The coolant tank for receiving the coolant is generally badly ventilated. In badly ventilated environment, contamination of the coolant will increase and because most of the pollutants are buoyant this creates a haven for micro-organisms and the micro-organisms further contaminate the coolant. When the contaminated coolant is applied to the cutting tool, the cutting tool erodes and deteriorates, resulting in poor quality work-pieces machined by the cutting tool. In addition, the contaminated coolant may also be a health hazard. Therefore, the coolant must be changed periodically to prevent contamination. Changing the coolant increases costs and takes time, thus decreasing the work efficiency.

In order to extend the usage life of the coolant, the buoyant pollutants such as debris and oil floating atop a body of the coolant should be removed. A typical apparatus for removing buoyant pollutants, such as oil, floating on top of coolant includes a metallic strip. The metallic strip rotates in the coolant and absorbs oil. Other pollutants mixed in the oil may adhere to and be removed from the coolant by the metallic strip. However, the efficiency of the metallic strip for removing pollutants is relatively low and the metallic strip cannot remove all of the pollutants.

Therefore, a high efficiency apparatus for removing pollutants, is desired.

SUMMARY

An apparatus, for removing pollutants floating atop a body of coolant, includes a filter, a pollutant removing structure, and a pump. The filter includes a housing, and a filtering unit positioned in the housing for removing the pollutants from the coolant. The filtering unit is separated into a first cavity and a second cavity by a partition sheet. The partition sheet is spaced apart from a bottom surface of the housing to define a communicating gap for the first cavity and the second cavity to communicate with each other. The pollutant removing structure is positioned on the filter. The pollutant removing structure includes a removing member for removing the pollutants out of the filter. The pump is configured for pumping the coolant into the first cavity of the filter.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present apparatus for removing pollutants floating atop a body of coolant. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present apparatus in detail.

Figure 1:
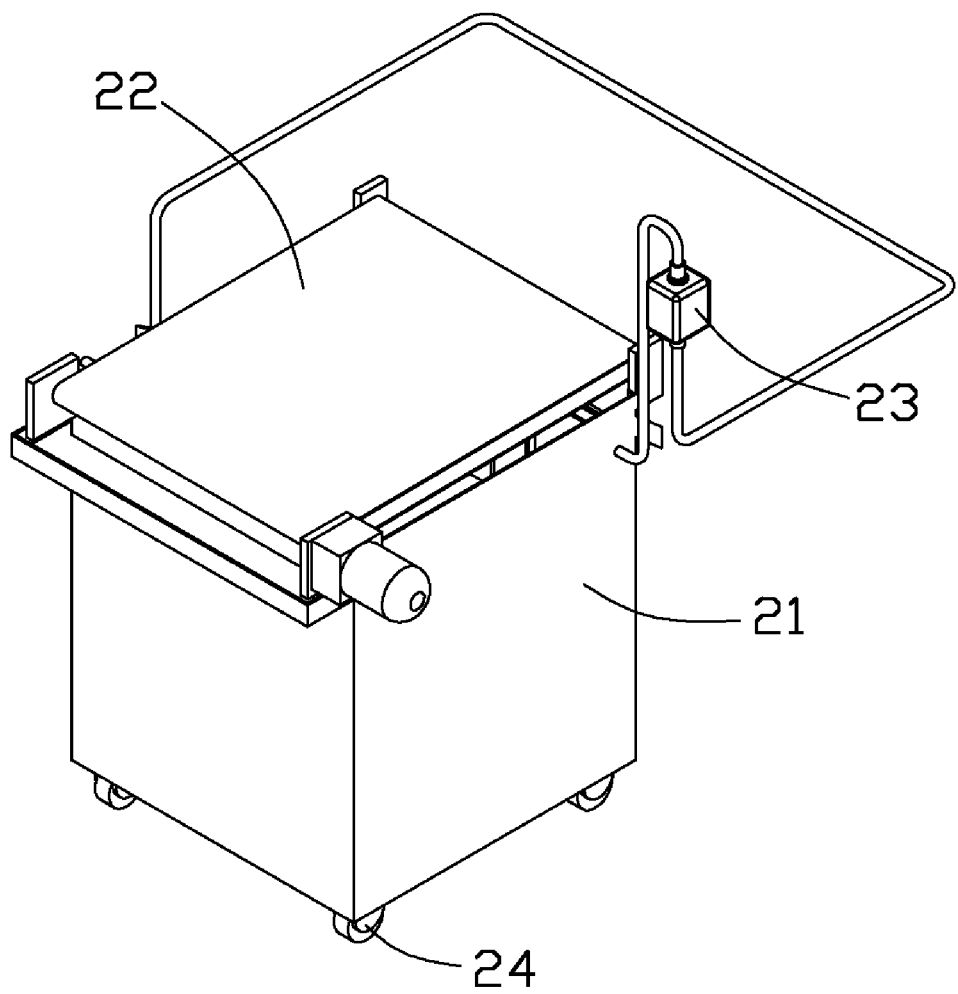
FIG. 1 is an assembled, isometric view of an apparatus for removing pollutants floating atop on a body of coolant in accordance with a preferred embodiment of the present invention.

Referring to FIG. 1, an apparatus 20 for removing pollutants such as debris and oil floating atop a body of coolant in accordance with a preferred embodiment is shown. The apparatus 20 includes a filter 21, a pollutant removing structure 22, and a pump 23. The pollutant removing structure 22 is positioned on the filter 21. The pump 23 is configured for pumping the coolant. Four wheels 24 are mounted at a bottom of the filter 21 for allowing the apparatus 20 to be transported conveniently.

Figure 2:
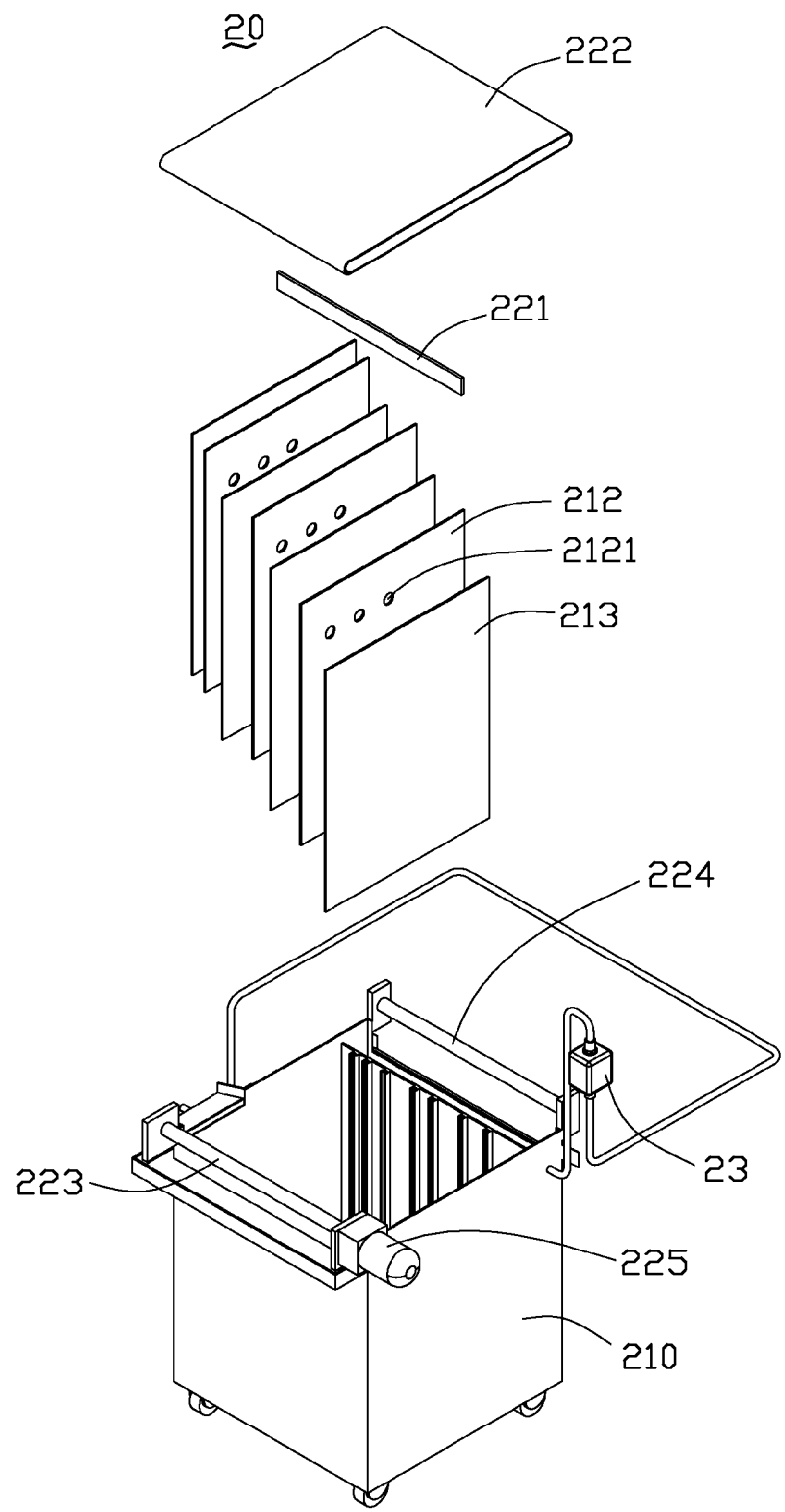
FIG. 2 is a partially exploded, isometric view of the apparatus of FIG. 1.
Figure 5:
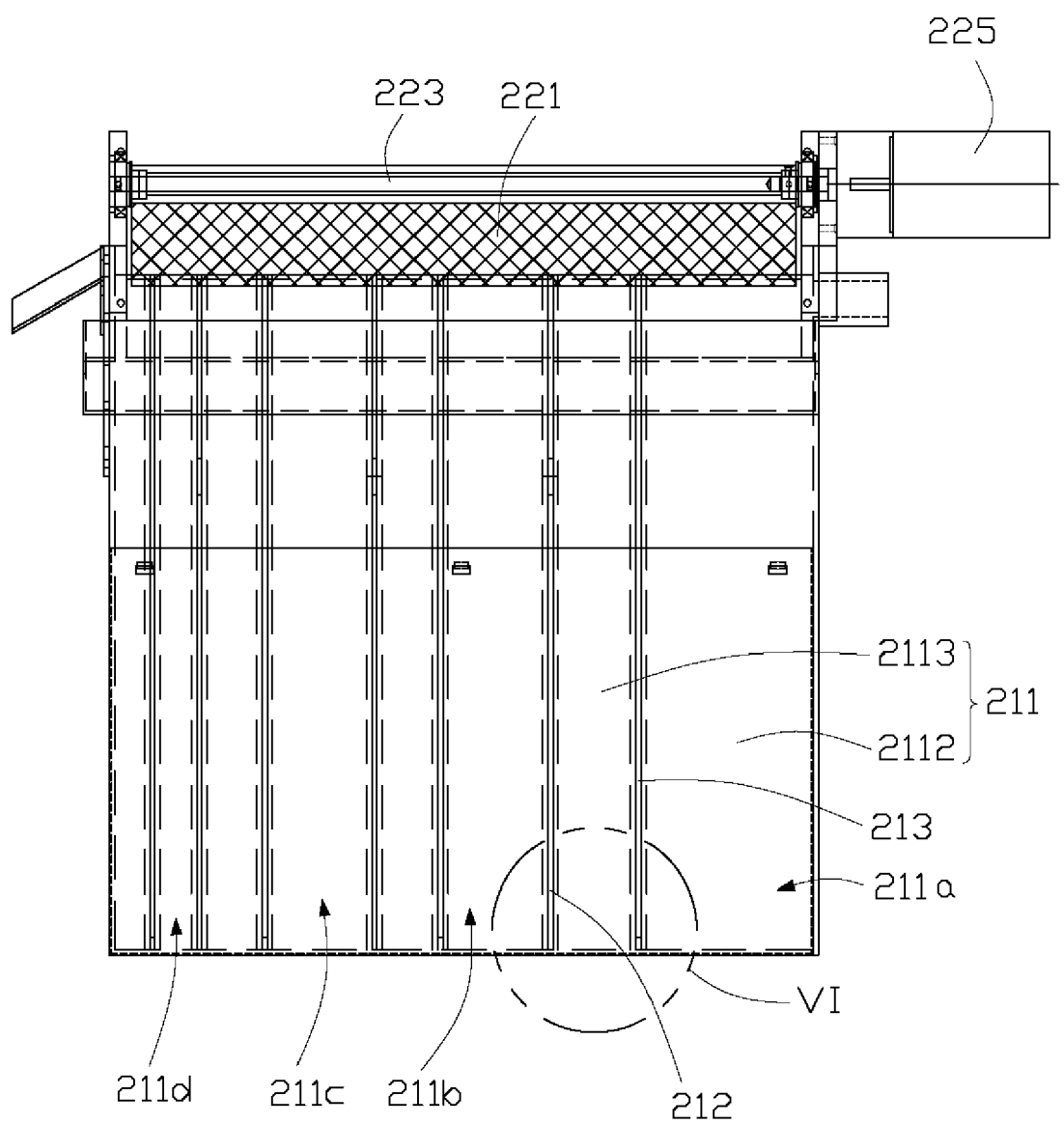
FIG. 5 is a side view of the apparatus of FIG. 1.
Figure 6:
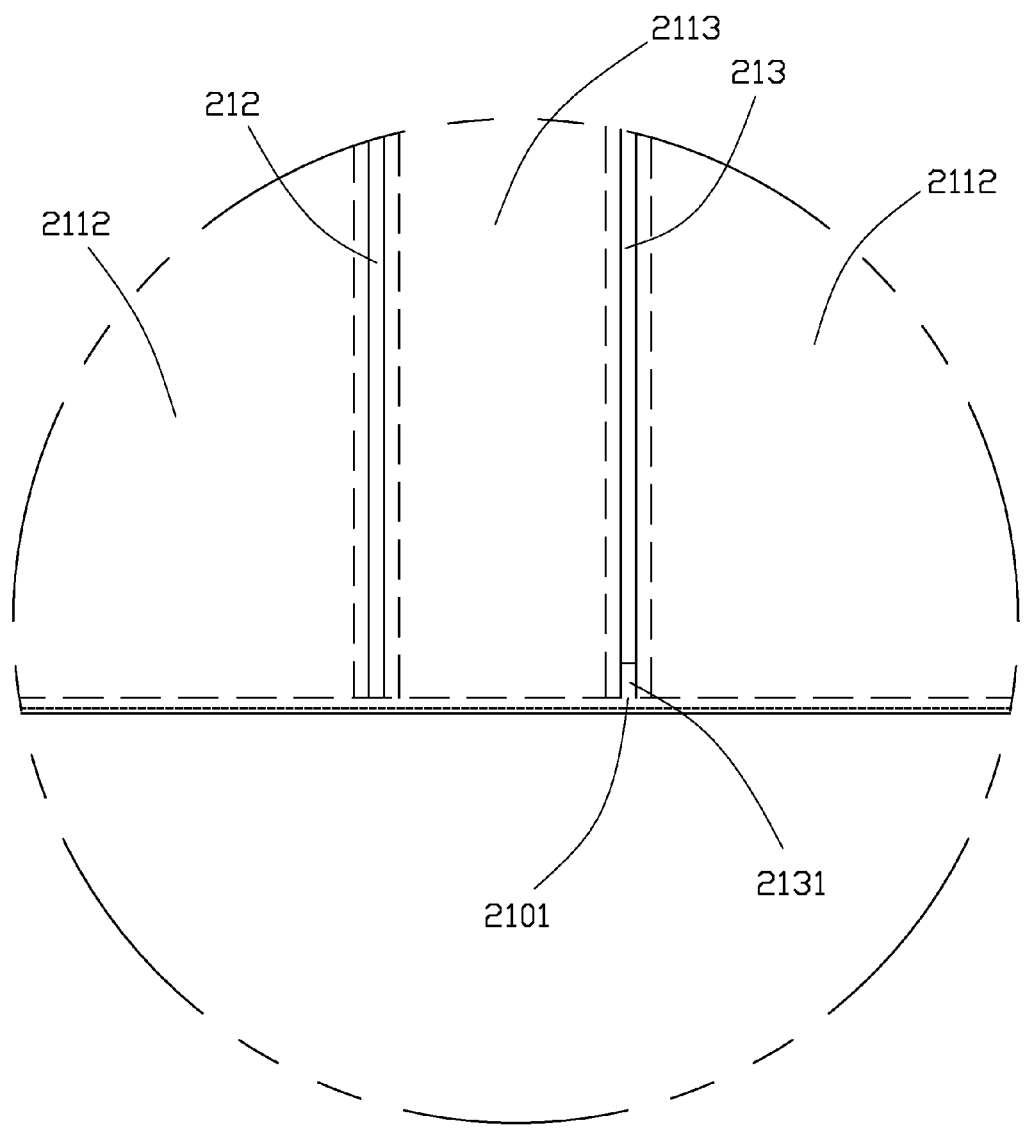
FIG. 6 is an enlarged view of a circled portion VI of FIG. 5.

Referring to FIGS. 2 and 5, the filter 21 includes a housing 210, a plurality of partition plates 212, and a plurality of partition sheets 213. The partition plates 212 and the partition sheets 213 are positioned in the housing 210 in an alternating manner, thereby forming a plurality of filtering units 211 that remove the pollutants from the coolant. The number of the filtering units 211 is preferably four, that is, the filtering units 211 include a first filtering unit 211a, a second filtering unit 211b, a third filtering unit 211c, and a fourth filtering unit 211d. Adjacent filtering units 211 are partially separated by the partition plates 212 correspondingly. Each of the partition plates 212 defines a plurality of through holes 2121 adjacent to a top portion of the partition plate 212. The through holes 2121 are configured for adjacent filtering units 211 to communicate with each other. Referring to FIG. 6, each of the filtering units 211 is further separated into a first cavity 2112 and a second cavity 2113 by the partition sheets 213 correspondingly. Each of the partition sheets 213 is spaced apart from a bottom surface 2101 of the housing 210, thereby defining a communicating gap 2131 for the first cavity 2112 and the second cavity 2113 to communicate with each other.

In use, the pump 23 pumps the coolant into the first cavity 2112 of the first filtering unit 211a. Because liquid pollutants such as the oil float on the coolant, when the coolant flows into the second cavity 2113 through the communicating gap 2131, the liquid pollutants are mostly filtered out by the partition sheet 213 of the first filtering unit 211a. Thus the liquid pollutants are mostly separated from the coolant by the first filtering unit 211a. When the coolant in the second cavity 2113 reaches the through holes 2121 of the partition plate 212, the coolant flows into the first cavity 2112 of the second filtering unit 211b. Because solid pollutants such as the debris have a larger density than that of the coolant, the solid pollutants are easily mixed into the coolant by the pump 23, thus most of the solid pollutants sink to the bottom surface 2101 (shown in FIG. 6) of the first filtering unit 211a due to gravity, and unable to pass through the through holes 2121 of the partition plate 212. The remaining pollutants in the second filtering unit 211b are further separated from the coolant by the second filtering unit 211b. In a similar principle, the coolant is further filtrated by the remaining filtering units 211 (the third filtering unit 211c and the fourth filtering unit 211d), thus yielding filtrated coolant. The pollutants separated from the coolant mostly remain in the first cavity 2112 of the first filtering unit. An amount of the pollutants separated from the coolant gradually decreases from the first filtering unit 211a to the fourth filtering unit 211d. Therefore, the filtrated coolant in the second cavity 2113 of the fourth filtering unit 211d contains almost no pollutants and the filtrated coolant can be reused.

It should be pointed out that, an amount of the filtering units 211 can also be at least one. When the amount of the filtering units 211 is only one, the partition plate 212 is omitted accordingly.

Figure 3:
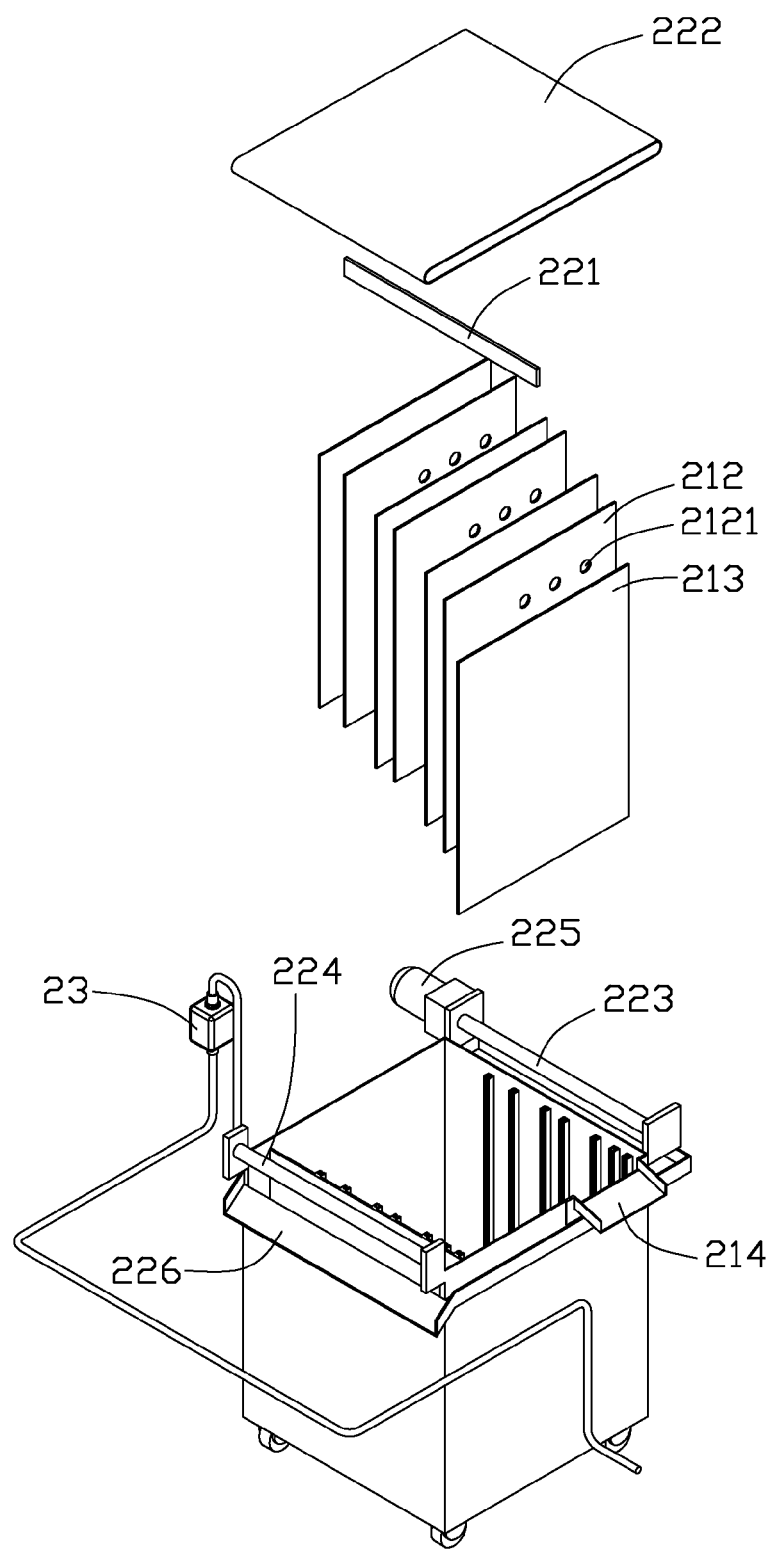
FIG. 3 is similar to FIG. 2, but viewed from another direction.
Figure 4:
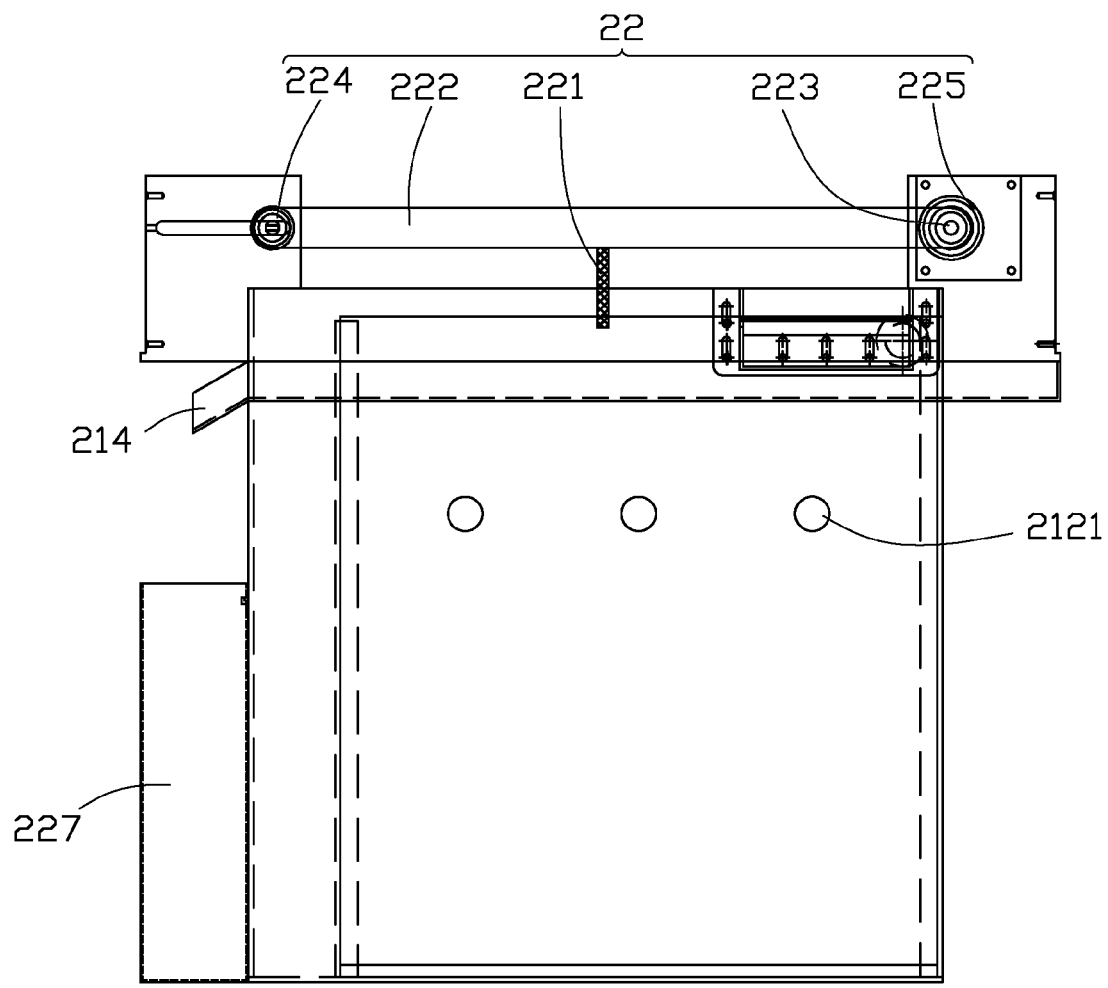
FIG. 4 is a front view of the apparatus of FIG. 1.

Referring to FIGS. 3 and 4, a top portion of the second cavity 2113 of the fourth filtering unit defines a coolant guiding groove 214 so that the filtrated coolant can flow into a coolant container (not shown) via the coolant guiding groove 214.

The pollutant removing structure 22 includes a removing member 221, a conveyer belt 222, a driver 223, a driven wheel 224, and a motor 225. The removing member 221 is a metallic piece or a brush fixed to the conveyer belt 222. The conveyer belt 222 is looped around the driver 223 and the driven wheel 224. The motor 225 is configured for driving the driver 223 so that the conveyer belt 222 rotates around the driver 223 and the driven wheel 224.

It should be pointed out that, one end of the pollutant removing structure 22 defines a pollutant exit 226. In FIG. 4, a receiving case 227 is positioned below the pollutant exit 226, and the pollutants can be pushed out from the filtering units 211 via the pollutant exit 226 and flow into the receiving case 227.

In use, an end of the removing member 221 is embedded below a surface of the floating pollutants. When the conveyer belt 222 is moved with the removing member 221, the removing member 221 sweeps the pollutants into the receiving case 227 from the pollutant exit 226. The removing member 221 directly pushes the pollutants from the coolant into the receiving case 227, thereby greatly increasing the efficiency for removing the pollutants.

It should be pointed out that, the pollutant removing structure 22 can be replaced by other structures, e.g., a reciprocating motion structure for driving the removing member 22 to move back and forth alternately. When the removing member 22 moves back and forth alternately, the removing member 221 directly pushes the pollutants from the coolant into the receiving case 227.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An apparatus for removing pollutants floating atop a body of a coolant, the apparatus comprising:
   a filter including a housing, a plurality of partition sheets, and a plurality of filtering units positioned in the housing for removing the pollutants floating atop the body of the coolant, each filtering unit being separated into a first cavity and a second cavity by a partition sheet, the partition sheet being spaced apart from a bottom surface of the housing to define a communicating gap for the first cavity and the second cavity to communicate with each other;
   a pollutant removing structure positioned on the filter for removing the pollutants out of the filter; and
   a pump configured for pumping the coolant into the first cavity of the filter;
   wherein the filter further comprises a plurality of partition plates, the partition plates and the partition sheet are positioned in the housing in an alternating manner to form the plurality of filtering units, adjacent filtering units being separated by the partition plates correspondingly, each of the partition plates defining a plurality of through holes adjacent to a top portion thereof for adjacent filtering units to communicate with each other.

2. The apparatus as claimed in claim 1, wherein the pollutant removing structure comprises a removing member, a conveyer belt, a driver, a driven wheel, and a motor, the removing member is fixed to the conveyer belt, the conveyer belt is looped around the driver and the driven wheel, and the motor is configured for driving the driver so that the conveyer belt rotates around the driver and the driven wheel.

3. The apparatus as claimed in claim 2, wherein the removing member is a metallic piece.

4. The apparatus as claimed in claim 2, wherein the removing member is a brush.

5. The apparatus as claimed in claim 1, wherein the pollutant removing structure defines a pollutant exit at one end thereof.

6. The apparatus as claimed in claim 5, further comprising a receiving case positioned below the pollutant exit for receiving the pollutants.

7. An apparatus for removing pollutants atop a body of a coolant, the apparatus comprising:
   a filter including a housing, a plurality of partition plates, and a plurality of partition sheets, the partition plates and the partition sheet positioned in the housing in an alternating manner to form a plurality of filtering units for removing the pollutants floating atop the body of the coolant, adjacent filtering units being separated by the partition plates correspondingly, each of the partition plates defining a plurality of through holes adjacent to a top portion thereof for adjacent filtering units to communicate with each other, each of the filtering units being separated into a first cavity and a second cavity by one of the partition sheets, and each of the partition sheets being spaced apart from a bottom surface of the housing to define a communicating gap for the first cavity and the second cavity of each filtering unit to communicate with each other;

a pollutant removing structure positioned on the filter, the pollutant removing structure including a removing member for removing the pollutants out of the filter; and a pump configured for pumping the coolant into the filter.

8. The apparatus as claimed in claim 7, wherein the pollutant removing structure further comprises a conveyer belt, a driver, a driven wheel, and a motor; the removing member is fixed to the conveyer belt, the conveyer belt is looped around the driver and the driven wheel, and the motor is configured for driving the driver so that the conveyer belt rotates around the driver and the driven wheel.

9. The apparatus as claimed in claim 7, wherein the pollutant removing structure defines a pollutant exit at one end thereof.

10. The apparatus as claimed in claim 9, further comprising a receiving case positioned below the pollutant exit for receiving the pollutants.

11. The apparatus as claimed in claim 7, wherein the removing member is a metallic piece.

12. The apparatus as claimed in claim 7, wherein the number of the plurality of filtering units is four.

13. The apparatus as claimed in claim 7, wherein the removing member is a brush.

* * * * *